July 14, 1942.  E. RODDEL  2,289,730
TRAILER HITCH
Filed July 31, 1940  2 Sheets-Sheet 1
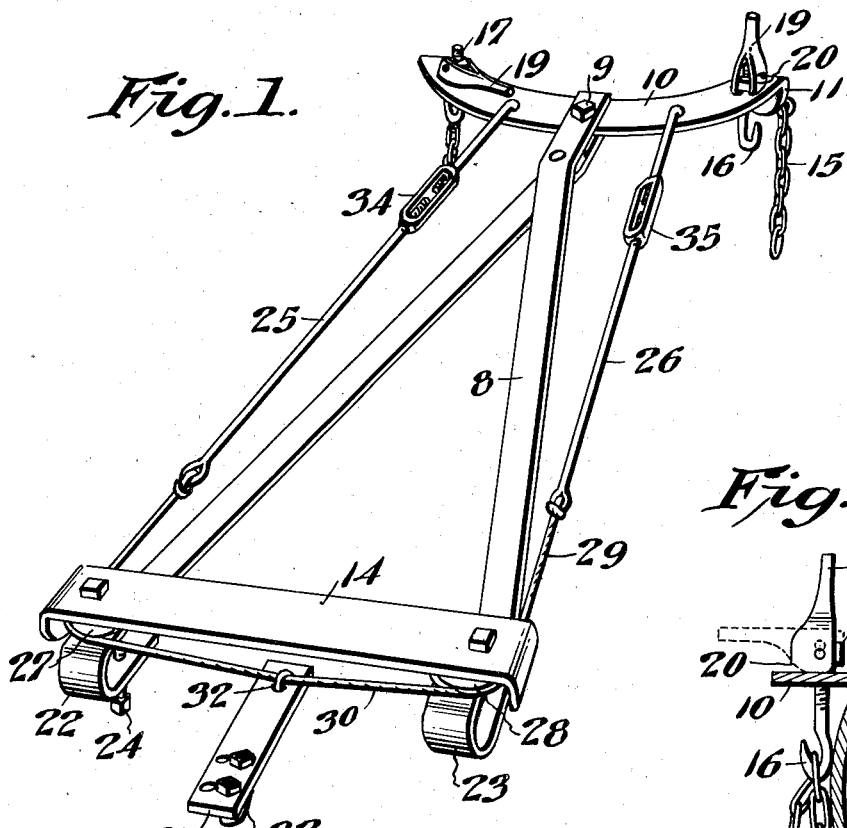
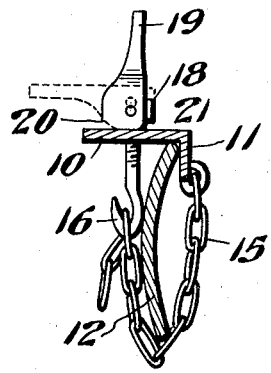
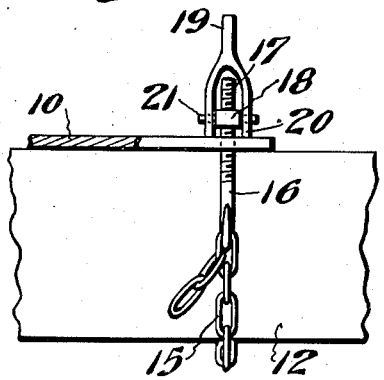
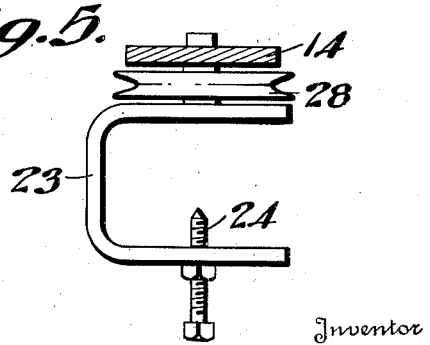
Inventor
Edd Roddel
By Leon W. Patel
Attorney July 14, 1942.  E. RODDEL  2,289,730
TRAILER HITCH
Filed July 31, 1940  2 Sheets-Sheet 2

Inventor
Edd Roddel
By Lloyd W. Patel
Attorney

Patented July 14, 1942

2,289,730

UNITED STATES PATENT OFFICE 2,289,730

TRAILER HITCH

Edd Roddel, Parker, S. Dak.

Application July 31, 1940, Serial No. 348,770

3 Claims. (Cl. 280—33.55)

My invention relates to improvements in trailer hitches, and particularly to a device of this character intended and adapted for use with a steering trailer and with an automobile or other such vehicle serving as the draft or motivating means.

An object of this invention is to provide a hitch that will keep the trailer in proper trailing position behind whatever is pulling it, and which insures proper steering and tracking of the trailer vehicle in either forward or backing travel.

Another purpose is to so construct the parts that my invention is adaptable for use in connection with either two or four-wheel trailers, steering both for forward and backing travel, and that in a four-wheeled trailer steering may be accomplished from the front or the back set of wheels, as may be desired and as the trailer may be accordingly hitched.

A further object is to provide a trailer hitch adaptable for use with trailed or trailer vehicles of usual construction, and which will prevent swaying and side swinging of the trailed vehicle, and will at the same time insure that the trailer is always behind the draft vehicle and is following in substantially the same general course of tracks.

Yet another object of this invention is to provide trailer hitch means by which the parts are quickly attached to the ordinary bumper forming a stock part of most pleasure and commercial automobiles; and, can be readily and quickly detached or unhitched to leave the bumper and other parts of the automobile or truck or other draft vehicle entirely clean and clear of any hitch or connecting parts.

Yet a further purpose is to provide a device of this character that is of simple and inexpensive construction and which will operate with highest efficiency when in use, with little likelihood of breakage or damage to any of the parts or of accidental disconnection, or displacement, through ordinary condtions of use.

With the above and other objects in view, some of which will be apparent to those skilled in the art, and others of which are inherent in the construction and arrangement of the parts, my invention includes certain novel features of construction and combinations and associations of parts which will be hereinafter set forth in connection with the drawings.

In the drawings:

Figure 1 is a view in perspective showing one embodiment of my invention as it appears when disconnected.

Fig. 4 is a fragmentary view to better show the attachment to the draft vehicle.

Fig. 5 is a broken sectional view to better illustrate the means for attaching the parts to the axle of a trailer vehicle.

Fig. 6 is a view substantially at right angles to Fig. 4.

As stated above, my invention is adaptable to and for use with and upon a trailer vehicle having a single set of wheels or upon a four-wheeled trailer vehicle, and with the four-wheeled trailer structure can be mounted and employed for accomplishment of steering from either the front or the back set of wheels, accordingly as the trailer may be hitched.

Figure 2:
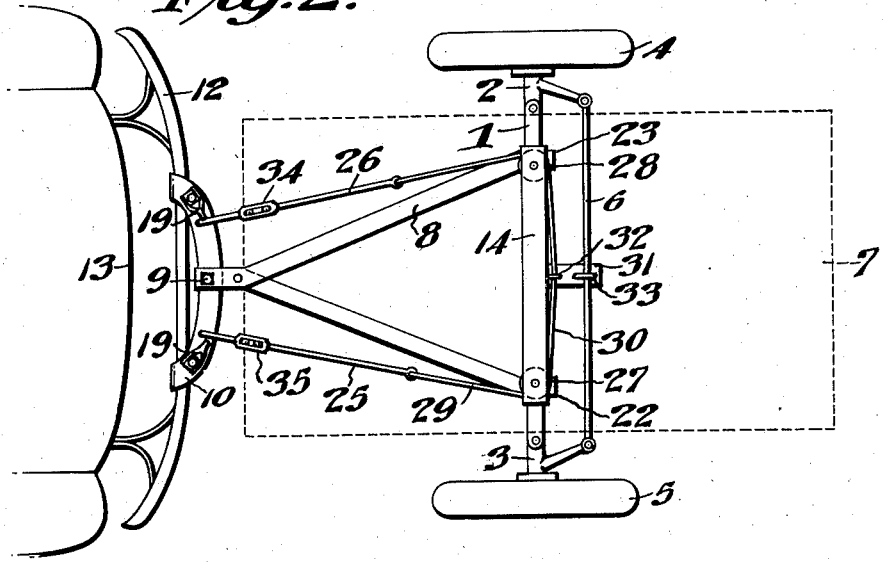
Fig. 2 is a top plan view somewhat schematically illustrating application of the hitch to and with a trailer chassis.

In the embodiment disclosed in Fig. 2 I have illustrated a trailer chassis structure somewhat schematically, and with this adaptation the axle 1 has steering knuckles 2 and 3 at the end thereof, the wheels 4 and 5 being mounted on the bearing spindles of these steering knuckles 2 and 3. The usual steering rod 6 is provided between the steering arms of the steering knuckles 2 and 3, and these parts may be of any desired construction and mounting, the purpose here being to illustrate one form of steering trailer mounting with which my invention may be employed. A body or bed or box structure, of any type and construction, can be mounted or supported upon or carried by the axle 1, in any desired manner, the relative position of such body being somewhat illustrated by the dotted lines at 7. Obviously, this body or box structure can be supported upon or attached to the axle 1 by means of springs, or in any other desired and suitable manner, and none of the parts thus described need be of special construction or mounting.

A draft tongue 8, which is here illustrated as being of substantially V-shaped form, is swingably or pivotally mounted, as by means of the pivot bolt or pin 9, in and upon the middle portion of equalizer bar 10. This equalizer bar 10 has the ends thereof extending laterally on opposite sides of the pivotal mounting of the tongue at 9, and the ends of the bar are preferably provided with hook flanges, as at 11, such flanges being adapted to be received over and to hold upon an automobile bumper 12 carried by an automobile, as generally indicated at 13, in Fig. 2.

A cross bar or plate 14 is connected at the ends of the substantially V-shaped draft tongue structure 8, and is welded or riveted or otherwise suitably connected to be substantially rigid and non-swingable.

As shown in Figs. 1 and 4, the equalizer bar 10 has at its ends means for quick attachment to and detachment from a bumper bar 12, of the equalizer bar. This means consists of chain lengths 15 with one end attached to the equalizer bar structure and the other end free and unsecured so that it may be brought down around the inside of the bumper bar and then may be looped up to wrap inwardly and outwardly around the bumper bar. Chain anchoring hooks 16 are slidably fitted through openings in the equalizer bar 10 with their hook ends presented in position to be hooked and engaged in the links of the chain 15. These hooks 16 have the upper ends of their shanks, as presented above the equalizer bar 10, externally screw threaded, as at 17, and adjusting nuts 18 are turned onto the threaded ends 17. Cam levers 19 are bifurcated adjacent to the cam ends 20, and the adjusting nuts 18 are received in these bifurcated openings and the cam levers are pivotally or swingably mounted on the adjusting nuts 18 by means of bearing pins 21, or other suitable bearing or pintle means. With this construction, the cam levers 19 will be swung up to positions shown in the upper right hand in Figure 1, and in full lines in Fig. 4. The equalizer bar 10 is then fitted with the flanges 11 hooked over a bumper bar 12 and the chain lengths 15 are then wrapped around and underneath the bumper bar and are caught upon the hooks 16. By rotating the cam levers 19, substantially around the axis of the threaded portion 17 of the hook 16, the adjusting nut 18 can be tightened down upon the hook 16 to draw the hook up and consequently tension the chain 15 around the bumper bar 12. As a final step, the cam levers 19 are swung downwardly, to the position shown at the upper left hand in Figure 1 and in dotted lines in Fig. 4, and the cam portion 20 then acts upon the pivot connection at 21 to exert upward drawing force upon the hook 16 and cinch or tighten the chain lengths 15 upon the bumper bar 12.

As shown in Figs. 1 and 2, the cross bar 14 has clips 22 and 23 depending adjacent to its ends, and these clips are adapted to be caught around the axle 1 of the trailer structure so that the draft tongue 8 is non-swingably connected with this axle. Clamp screws or bolts 24 are provided in conjunction with the clips 22 and 23 to insure rigid and secure mounting on the axle 1.

With the parts constructed and mounted in the manner above set forth, the equalizer bar 10 is substantially rigidly attached to and secured upon the rear bumper 12 of the towing vehicle, the draft tongue 8 substantially rigidly connected with and upon the axle 1 of the trailer vehicle, and this tongue has swingable mounting, at 9, with the equalizer bar 10.

Draw bars 25 and 26 are swingably connected on the equalizer bar 10 at points preferably spaced equally on opposite sides of the swinging connection at 9 of the draft tongue 8 therewith. The cross bar 14 has cable pulleys 27 and 28 revolubly carried thereby at points spaced laterally outwardly on each side of a medial line through the draft tongue structure 8, and a steering cable 29 has its ends connected with the draft rods 25 and 26 and has its middle portion 30 stretched transversely across between the pulleys 27 and 28. A steering connecting plate 31 is disposed preferably adjacent to and to be substantially coextensive with the medial line through the draft tongue structure 8, and has one end connected to the steering portion 30 of the cable 29, as by means of a U-clip 32, or other suitable cable anchoring means.

U-bolts or clips 33 are carried by this connecting plate 31 and are adapted to be caught around and secured to the steering rod 6.

To insure proper tension on the draft rods 25 and 26 and the cable 29, turnbuckles are provided, as at 34 and 35, and the cable 29 can thus be adjusted to and be maintained under the proper tension or tautness for the particular conditions of use or other particular installation.

With the parts constructed and attached in the manner set forth, as the automobile or other draft vehicle 13 is propelled and is steered the equalizer bar 10 will be rigidly carried by and with the bumper 12, and as the draft tongue 8 is swingably connected at 9 with this equalizer bar 10 any relative swinging of the bar 10 will exert corresponding forces upon the draft rods 25 and 26 to move the portion 30 of the steering cable 29 in one direction or the other and around the cable pulleys 27 and 28, so that the steering bar 31 is correspondingly moved. Since the steering bar 31 is fixedly connected with the steering rod 6, the movement of the cable as imparted to the steering bar 31 will cause steering rod 6 to be correspondingly moved in such manner that the steering knuckles 2 and 3 will turn the wheels 4 and 5 and the direction of travel of these wheels will consequently be changed to steer the trailer vehicle to follow the course of the draft vehicle. It will of course be appreciated and understood that as the direction of travel of the draft vehicle is reversed to back the same, the movement of the steering wheels will be similarly varied to accomplish steering of the trailer in both backing and forward travel.

Figure 3:
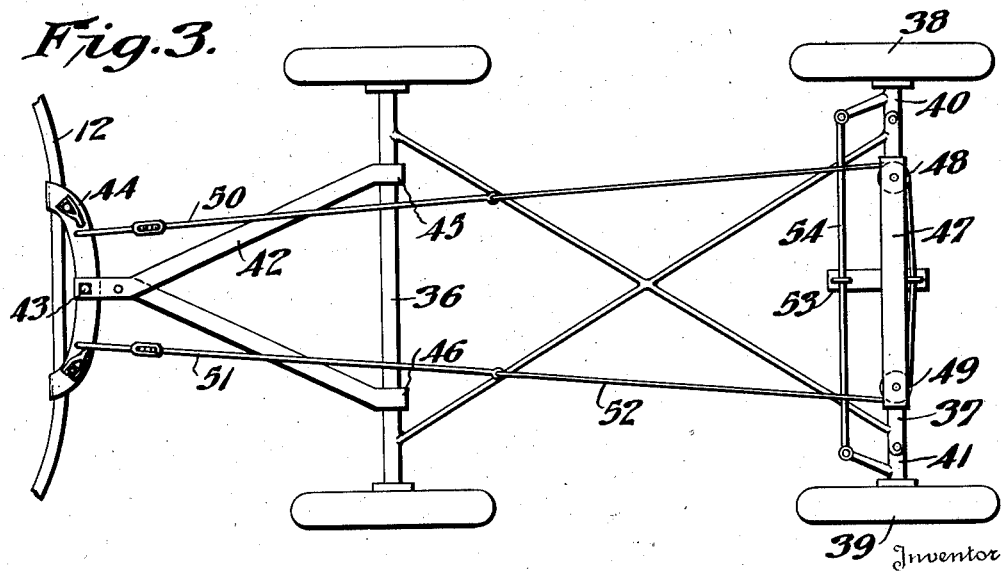
Fig. 3 is a view similar to Fig. 2 disclosing another adaptation.

With the embodiment illustrated in Fig. 3, adaptation of the invention to a four-wheeled trailer having rear steering wheels is disclosed. Where a four-wheeled trailer vehicle has the front wheels employed as steering wheels, the connection will be made and the parts will be hitched substantially after the manner illustrated in Fig. 2, and the action and functioning of the parts will be substantially as described. With the rear wheel steering four-wheeled trailer, the forward axle 36 is rigid and the rear axle 37 of the trailer vehicle has the wheels 38 and 39 thereof carried by steering knuckles 40 and 41. The draft tongue 42 is pivotally or swingably connected, as at 43, to the equalizer bar 44, which is in turn connected with the rear bumper of a towing vehicle, as for example bumper 12 of the automobile or other vehicle generally indicated at 13. The clip portions 45 and 46 at the ends of the draft tongue 42 connect this draft tongue rigidly on axle 36, substantially after the manner of connecting clips 22 and 23, and it will of course be understood that perch or radius rod or other connecting means will be provided between the axle 36 and the axle 37, or these parts will be connected with a body or frame structure of the trailer vehicle so that the axle 37 is moved with and in the direction of movement of axle 36. The cross bar 47, similar to cross bar 14, is mounted on the steering axle 37 by any suitable means, as for instance clips similar to clips 22 and 23. and this cross bar has the cable pulleys 48 and 49 revolubly carried thereby. Draw rods 50 and 51 are pivotally or swingably connected with equalizer bar 44 at points spaced on opposite sides of the pivotal or swingable mounting of the draft tongue 42 with this equalizer bar, as at 43. A cable 52 extending over cable pulleys 48 and 49 has its ends connected with the draw rods 50 and 51, and a steering bar 53, similar to steering bar 31, is connected with the portion of the cable between the wheels 48 and 49 and is extended forwardly with its free end connected with the steering rod 54 by which the steering knuckles 40 and 41 are moved and controlled. It will be noted that in this adaptation the steering bar 53 extends forwardly and is connected at its end with the steering rod 54 in front of the steering axle 57, as this is the normal position of the steering rod in a four-wheeled trailer having the steering axle in the rear, and by such arrangement the wheels 38 and 39 will be properly turned to insure tracking or following travel of the trailer vehicle as the draft vehicle at 13 is steered around corners and is propelled or moved either forwardly or rearwardly in other than straight line travel.

With the construction and arrangement of the parts, and the connection of the hitch with the towing and the trailer vehicles, in the manner above set forth, the trailer vehicle will be held against side swaying or zigzagging, and the trailer will be steered to track the towing vehicle in either forward or backing travel.

While I have herein shown and described only certain specific embodiments of my invention and have set forth only certain possible adaptations and uses, it will be appreciated that changes and variations can be made in the form and construction of the parts as well as in the assembly and use thereof, to suit different conditions and embodiments, without departing from the spirit and scope of my invention.

I claim:

1. A trailer hitch comprising with a steering trailer and a towing vehicle, a tongue, clip means by which said tongue is non-swingably connected with an axle of the trailer, an equalizer bar swingably connected at the remaining end of the tongue with the ends of the equalizer bar extending laterally on opposite sides thereof, means for detachably connecting said equalizer bar with the towing vehicle, a cross bar mounted on the steering axle of the trailer vehicle, a pair of spaced cable pulleys carried by said cross bar, a steering rod by which the steering wheels of the trailer are controlled and moved, a cable running over said spaced pulleys and having its ends extending forwardly substantially on opposite sides of the medial line of the tongue and connected with the equalizer bar on opposite sides of the swinging connection of the tongue therewith and at points spaced therefrom, and a connecting bar connecting the portion of the cable intermediate the cable pulleys with the steering rod.

2. As an article of manufacture a unitary trailer hitch structure for use with a towing vehicle having a bumper and a trailer vehicle having a front axle provided with steering road wheels moved by a steering rod, a tongue structure having a pair of side bars connected together at their forward ends and diverging in substantially V-shaped formation and a cross bar connected with and holding the diverging ends of said side bars in separated spaced relation, an equalizer bar swingably connected at the connected ends of said side bars of the tongue structure, means at the ends of said equalizer bar adapted to connect with the bumper of the towing vehicle, clips at the ends of the side bars adjacent to the cross bar of the tongue structure adapted to connect with the front axle of the trailer vehicle, spaced cable pulleys carried by the tongue structure substantially at the points of connection of the cross bar with the side bars thereof, a cable running over said spaced pulleys having its ends connected with the equalizer bar at points spaced on each side from the swingable connection of the tongue therewith, and means carried by the middle portion of the cable intermediate said spaced pulleys adapted to connect the cable with the steering rod of the trailer vehicle.

3. A trailer hitch comprising with a towing vehicle and a trailer vehicle having steering wheels on the rear axle thereof moved by a steering rod, a tongue structure connected with the forward axle of the trailer vehicle, an equalizer bar swingably connected at the forward end of the tongue structure, a cross bar mounted on the rear axle, cable pulleys mounted in spaced apart relation on said cross bar, a cable extending over said spaced pulleys and having its ends connected with the equalizer bar at points spaced from and on opposite sides of the swinging connection of the tongue structure therewith, and means connecting the middle portion of said cable intermediate said spaced cable wheels with the steering rod of the steering wheels.

EDD RODDEL.